(12) United States Patent
Orii

(10) Patent No.: US 6,691,917 B2
(45) Date of Patent: Feb. 17, 2004

(54) MANUAL MAGNETIC CARD READER AND METHOD OF READING MAGNETIC DATA

(75) Inventor: Tsutomu Orii, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 10/253,064

(22) Filed: Sep. 24, 2002

(65) Prior Publication Data

US 2003/0071120 A1 Apr. 17, 2003

(30) Foreign Application Priority Data

Sep. 26, 2001 (JP) ........................................ 2001-294799

(51) Int. Cl.[7] ................................................. G06K 7/08
(52) U.S. Cl. ........................ 235/449; 235/479; 235/480; 235/482
(58) Field of Search ................................. 235/449, 482; 341/123, 71, 132

(56) References Cited

U.S. PATENT DOCUMENTS

| | | | | | |
|---|---|---|---|---|---|
| 3,783,249 A | * | 1/1974 | Wiegand | ................... | 235/449 |
| 4,529,872 A | * | 7/1985 | Dinges | ........................ | 235/482 |
| 4,581,523 A | * | 4/1986 | Okuno | ........................ | 235/479 |
| 4,684,794 A | * | 8/1987 | Holland-Letz | ............... | 235/449 |
| 5,559,317 A | * | 9/1996 | Wong et al. | ................. | 235/449 |
| 6,476,743 B1 | * | 11/2002 | Brown et al. | ................ | 341/123 |

FOREIGN PATENT DOCUMENTS

JP        2744512        2/1998

* cited by examiner

Primary Examiner—Karl D. Frech
Assistant Examiner—Kimberly Nguyen
(74) Attorney, Agent, or Firm—Reed Smith LLP

(57) ABSTRACT

A manual magnetic card reader allows a card with a magnetic strip to be inserted in a card insert slot to a card stop position and then allows the card to be removed. The reader comprises a magnetic head for reading magnetic data recorded in the magnetic strip, a data editing portion for editing the magnetic data and a saving buffer for saving the magnetic data of the card that is read during card insertion. The magnetic data is read and saved in the saving buffer during the card insertion and the magnetic data is also read during card removal.

4 Claims, 3 Drawing Sheets

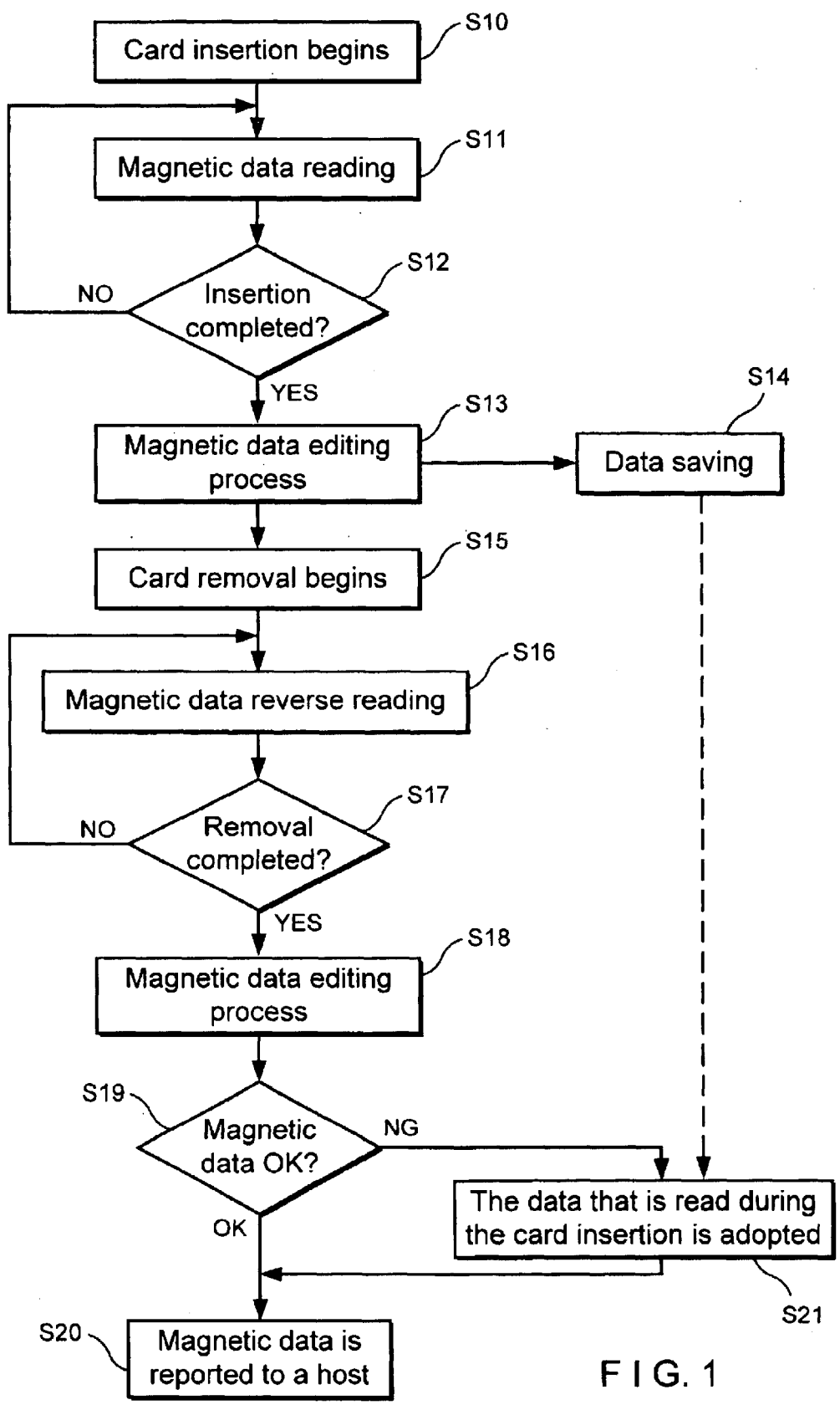
F I G. 1

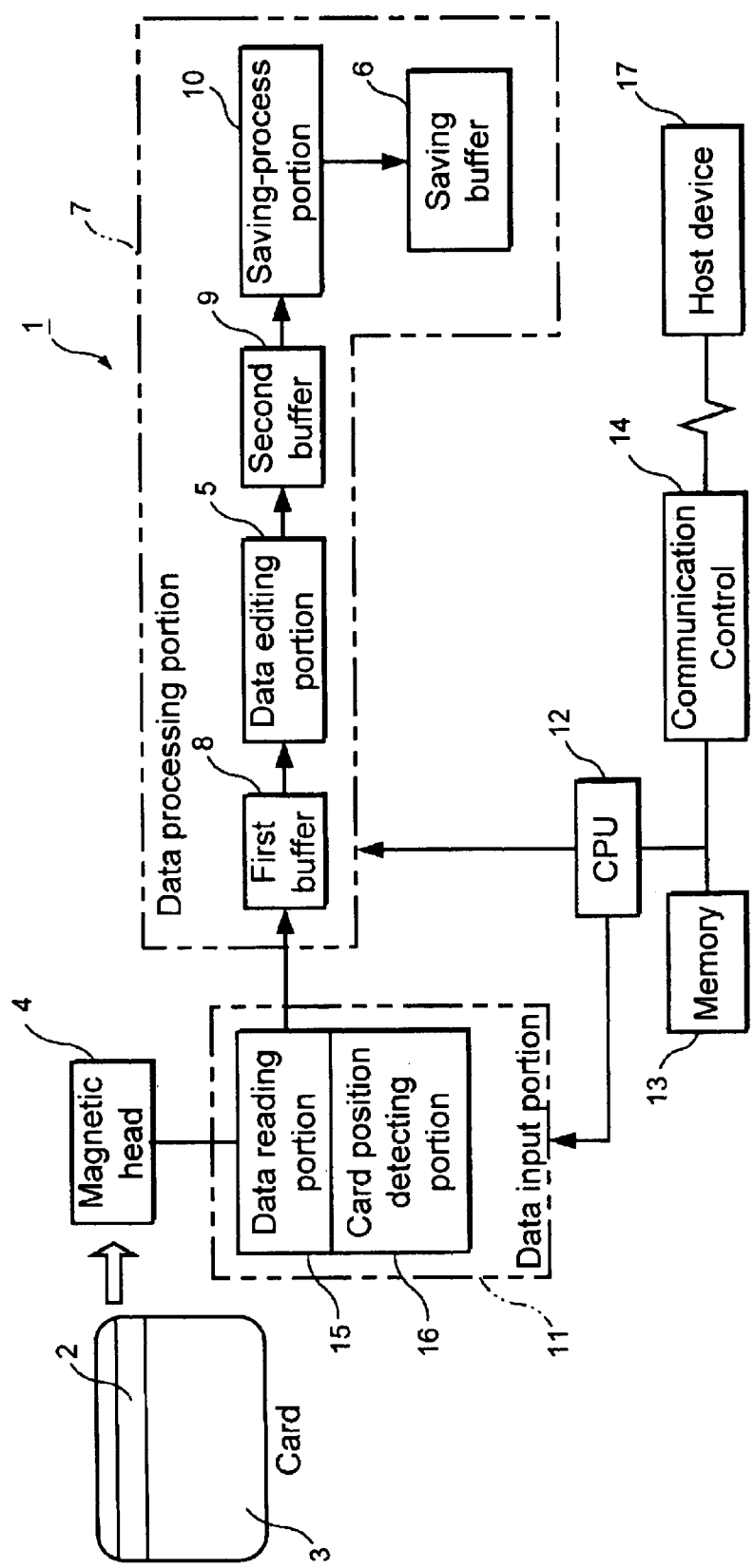
F I G. 2

MANUAL MAGNETIC CARD READER AND METHOD OF READING MAGNETIC DATA

CROSS-REFERENCE TO RELATED APPLICATIONS

This application claims priority of Japanese Application No. 2001-294799, filed Sep. 26, 2001, the complete disclosure of which is hereby incorporated by reference.

a) Field of the Invention

The present invention is related to a manual magnetic card reader and a method of reading magnetic data. More specifically, the present invention relates to a manual magnetic card reader in which a user inserts and removes a card by hand and a method of reading magnetic data.

b) Description of the Related Art

Manual magnetic card readers are roughly divided into two types: one in which a magnetic strip moves with respect to a magnetic head as a card runs through a card-passing groove in the card reader, to read recording data; another in which a magnetic strip moves with respect to a magnetic head as a card is inserted at a card inlet provided to the card reader, pushed in deep, and pulled out by user's hand, to read recording data.

FIG. 3 illustrates a manual magnetic card reader of the latter type. In the manual magnetic card reader, a recess portion 102 is formed so that a card 101 can be pushed deep inside by hand. A magnetic head 103 is arranged on a side of the recess portion 102 so that magnetic data can be read as the card 101 moves during the insertion.

However, if the card 101 is held in a wrong position, a user may change the holding position of the card 101 when inserting the card 101. In such a case, the card 101 is completely stopped while the magnetic head 103 is still reading the data. Consequently a reading error occurs. Further, a user may forget to remove the card 101 after the insertion.

For these reasons, a manual magnetic card reader in which magnetic data is read by using the movement of the card 101 during card removal has been developed. A flowchart in FIG. 4 shows the steps of reading magnetic data in a magnetic strip 104 of the card 101 by a manual magnetic card reader of this kind. First, card 101 is inserted (Step 1); the completion of the card 101 insertion is detected (Step 2; Yes); the card 101 removal is expected. When the beginning of the card 101 removal is detected (Step 3), magnetic data is read (Step 4). As the removal of the card 101 is completed (Step 5; Yes), the magnetic data is edited (Step 6) and the reading result (the magnetic data) is reported to a host (Step 7).

However, because the above-mentioned manual magnetic card reader reads magnetic data by using the movement of the card 101 during the card removal, if the card removing movement is temporarily sustained while the card 101 is being removed or if the removing speed is considerably changed, a part of the data may be wrongly read from the magnetic strip 104. In this case, since it is determined that the magnetic data is abnormal, the card 101 needs to be inserted and removed again. Thus, the operation becomes troublesome and problematic.

OBJECT AND SUMMARY OF THE INVENTION

An object of the present invention is to provide a manual magnetic card reader and a method of reading magnetic data by which, even when a reading error occurs during the card removal, magnetic data can be read without repetition of insertion/removal operations.

To achieve the above object, in a manual magnetic card reader that allows a card with a magnetic strip to be inserted in a card insert slot to a card stop position and then allows the card to be removed, the invention comprises a magnetic head for reading magnetic data recorded in the magnetic strip, a data editing portion for editing the magnetic data, and a saving buffer for saving the magnetic data of the card during card insertion, wherein the magnetic data is read and saved in the saving buffer during the card insertion and the magnetic data is also read during card removal.

Also, in accordance with the invention, a method of reading magnetic data of a card, used in a manual magnetic card reader that allows a card with a magnetic strip to be inserted in a card insert slot to a card stop position and then allows the card to be removed, the method comprises that the magnetic data is read and saved during card insertion and the data is also read during card removal; when the magnetic data can be read during the card removal, that magnetic data is used as reading data; when the magnetic data cannot be read during the card removal, the magnetic data that is read during the card insertion is used as reading data.

Thus, since the magnetic data is read during the card insertion and saved in the saving buffer, even if the magnetic data cannot be read during the card removal, the loss of the magnetic data, which is caused during the card removal, can be complemented by the reading data that is saved in the saving buffer during the card insertion. In other words, the data that is read most recently is used as the reading result. Consequently the repetition of card insertion/removal can be greatly reduced.

BRIEF DESCRIPTION OF THE DRAWINGS

In the drawings:

FIG. 1 is a flowchart of an example of the embodiments of a magnetic data reading method of the present invention;

FIG. 2 is a diagram of an example of the embodiments of a manual magnetic card reader of the present invention;

DESCRIPTION OF THE PREFERRED EMBODIMENTS

Figure 3:
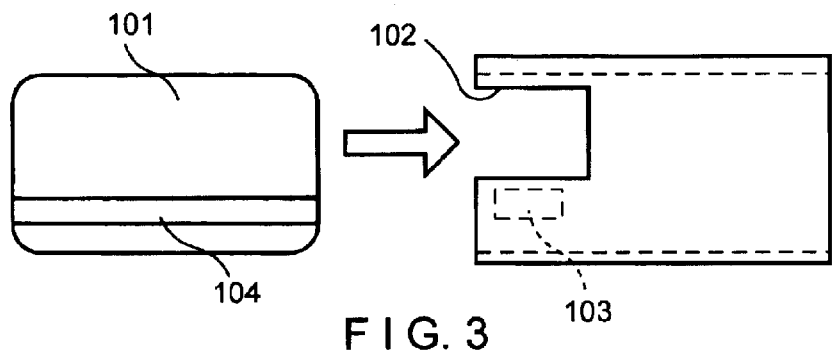
FIG. 3 is a diagram of a conventional manual magnetic card reader.
Figure 4:
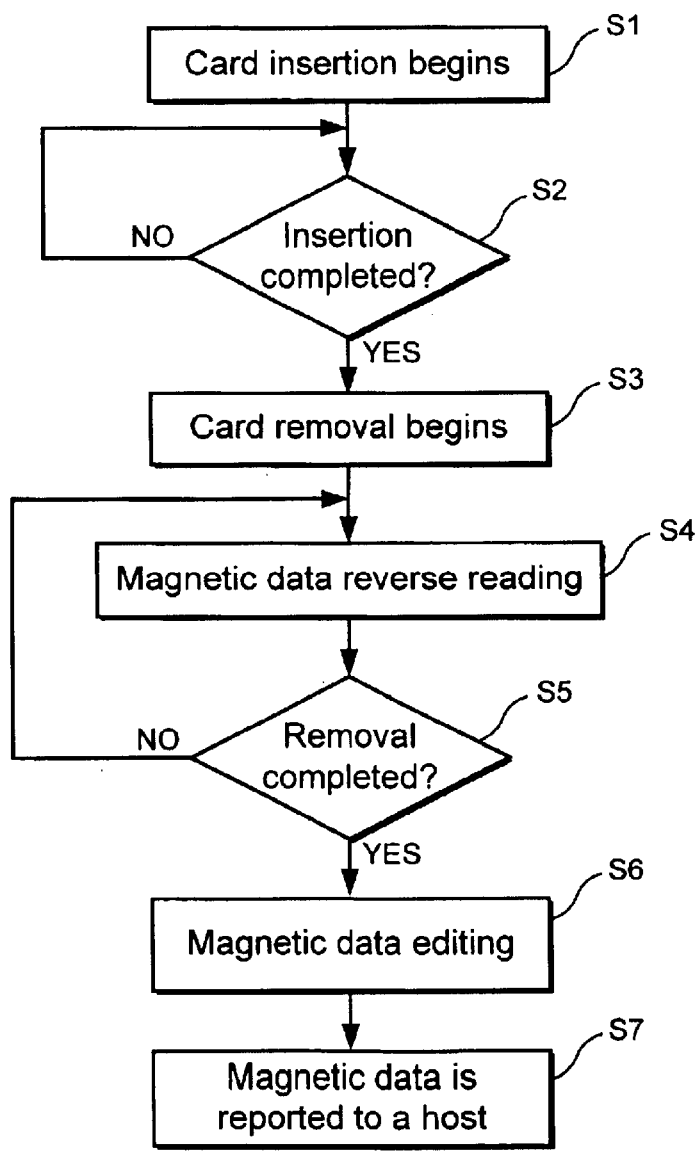
FIG. 4 is a flowchart of an example of a conventional magnetic data reading method.

The configuration of the present invention is described in detail hereinafter based on the most preferable form illustrated in the figures.

FIG. 2 shows an embodiment of a manual magnetic card reader 1 to which the present invention is applied. Manual magnetic card reader 1 lets a card 3 with magnetic strip 2 be inserted in a card insertion slot to a card stop position and then lets the card 3 be removed. The manual magnetic card reader 1 comprises a magnetic head 4 for reading magnetic data recorded on magnetic strip 2, a data editing portion 5 for editing the magnetic data, and a saving buffer 6 for saving the data of card 3 that is read during the card insertion. Further, in the manual magnetic card reader 1, the magnetic data is read and saved in the saving buffer 6 during the card insertion, and the magnetic data is also read during the card removal.

In the editing process at the data editing portion 5, a synchronous "start sentinel code" is first detected in the magnetic data (raw data) which is read from the magnetic card, and then a character is cut out at "an end sentinel code" and "LRC" for every character, based on the recording specification defined by JIS or X6302. The character cutting process may be performed in conjunction with a character data check (character correct coding confirmation). It is clear that the editing process is not limited to the above-mentioned process.

Since the magnetic data is read during the card insertion and saved in the saving buffer 6, even when the magnetic data cannot be read during the card removal, the magnetic data that is read and saved in the saving buffer 6 during the card insertion can be used to complement the magnetic data that is lost during the card removal. Consequently the repetition of insertion/removal operation can be greatly reduced, improving the operability.

The card 3 is an IC card that has IC contacts and a magnetic strip 2, for example. The number of the data tracks formed on the magnetic strip 2 is not specifically limited. In other words, no matter how many data tracks are present, for example, one or three, the data that could not be read during the card 3 removal can be complemented with the data that is read during the card insertion. Also, the manual magnetic card reader 1 comprises a magnetic head 4 and an IC contacts block. The magnetic head 4 is arranged on a side of a recess portion that is provided before the card insertion slot. The magnetic head 4 reads data by a bit width measuring method. The magnetic head 4 used by the bit width measuring method is capable of reading data even when the card 3 is transported at a low speed as long as the transportation of the card 3 is not totally stopped.

Further, the manual magnetic card reader 1 comprises a data processing portion 7. The data processing portion 7 has a first buffer 8, in which the magnetic data read by the magnetic head 4 is stored unedited, a data editing portion 5, a second buffer 9, in which the magnetic data edited by the data editing portion 5 is stored, a saving-process portion 10 which performs a saving process on the magnetic data stored in the second buffer 9, and a saving buffer 6. In the data processing portion 7, the magnetic data read by the magnetic head 4 is stored unedited in the first buffer 8. Then, the data stored in the first buffer 8 is edited in the data editing portion 5 and stored in the second buffer 9. Further, the data stored in the second buffer 9 is processed in the saving process portion 10, and finally saved in the saving buffer 6.

The second buffer 9 retains the editing result of the reading data, the data that is read during the card 3 insertion is kept in the saving buffer 6, and the data that is read and edited at this time (during the card removal) is stored in the second buffer 9. When the data is sent to a host device 17, the content of the data stored in the second buffer 9 is sent as the primary data.

In the saving process in the saving process portion 10, normally the entire data from "the start sentinel code" to "the end sentinel code" and "LRC" of the magnetic data is duplicated in the saving buffer 6. In other words, the duplication of the reading data is a primary purpose of the process. At that time, the saving process may be a process of duplicating only the reading data that is read during the card insertion. However, it is not limited to this.

In addition to the magnetic head 4 and the data processing portion 7, the manual magnetic card reader 1 also comprises a data input portion 11, a CPU 12, a memory 13, and a communication control 14.

The data input portion 11 has a data reading portion 15, which reads electric signals generated by the magnetic head 4 as magnetic data, and a card position detecting portion 16, which detects the position of the card 3 with respect to the manual magnetic card reader 1. The CPU 12 controls the data processing portion 7 and the data input portion 11. The memory 13, composed of RAM, ROM, etc., has programs and data necessary for controlling the CPU 12. The communication control 14 is an interface to connect the manual magnetic card reader 1 and the host device 17.

The process steps of the magnetic data reading method of the present invention, which are used in the above-stated manual magnetic card reader 1, are described based on a flowchart in FIG. 1.

When a legal card 3 is inserted in the card insertion slot (Step 10), the magnetic head 4 generates electric signals, which prompt the data reading portion 15 to read the magnetic data (Step 11). The magnetic data that is read at that time is stored unedited in the first buffer 8.

Then, the card position detecting portion 16 detects if the card 3 is completely inserted (Step 12). If the insertion of the card 3 is not completed (Step 12; No), the reading of the magnetic data continues (Step 11). When the insertion of the card 3 is completed (Step 12; Yes), the data editing portion 5 edits the data signals stored in the first buffer 8 (Step 13). Then, the edited data signals are stored in the second buffer 9, and are further processed for saving by the saving-process portion 10 and stored in the saving buffer 6 (Step 14). Here, the data of the card 3 that is read during the insertion is stored in the first buffer 8, starting from the beginning address of the buffer, according to the reading order as the data is read by the magnetic head 4.

On the other hand, when the card 3 starts being pulled (Step 15), the data reading portion 15 starts to read the magnetic data in the direction opposite of that during the insertion (Step 16). The magnetic data that is read at that time is stored unedited in the first buffer 8.

Then, the card position detecting portion 16 detects if the card 3 is completely removed (Step 17). If the card 3 is not completely removed yet (Step 17; No), the reading of the magnetic data continues (Step 16). When the card 3 is completely removed (Step 17; Yes), the data editing portion 5 edits the data signals that are stored in the first buffer 8 (Step 18). The edited data signals are stored in the second buffer 9. The data of the card 3 that is read during the removal is stored in the first buffer 8, starting from the ending address of the buffer, according to the reading order as the data is read by the magnetic head 4. In this manner, the order of the data signals stored during the card removal is made to be the same as that of the data signals stored in the saving buffer 6 during the card insertion.

Further, it is determined if the magnetic data that is read during the card removal is stored in the second buffer 9 (Step 19). When stored (Step 19; OK), this magnetic data is sent to the host device 17 (Step 20). When even just a portion of the magnetic data is not stored (Step 19; NG), at least the loss of the data is complemented with the data signals that are stored in the saving buffer 6; then, the complete magnetic data is sent to the host device 17 (Step 20). Consequently the data that is read most recently is reported to the host device 17.

For this, even when the magnetic data cannot be read during the card removal, the magnetic reading data that is stored in the saving buffer 6 during the card insertion is used to complement the missing data. Therefore, a single insertion/removal operation of the card 3 can provide the data reading two times. Consequently the magnetic data of the card 3 can be read very accurately without a repetition of insertion/removal operations.

Also, according to this embodiment, the data editing portion 5 allocates the magnetic data in the first buffer 8 in the reading order, starting from the beginning address of the buffer, during the card insertion, and also allocates the data starting from the ending address of the buffer 8 during the card removal. Thus, the data that has been already read into the buffer in the right order does not need to be reversed in its reading order, but two kinds of data groups in the right and reverse reading orders can be edited into the data groups of the same order. Consequently, compared to the independent data reversing process, this data process is faster.

Note that although the above-mentioned embodiment is an example of the preferred forms of the present invention, it is not limited to this embodiment, it can be varyingly modified within the scope of the present invention. For example, in the embodiment illustrated in FIG. 1, the magnetic data that is read during the card removal is stored in the second buffer 9 but not in the saving buffer 6; however, it is not limited to this. Among the data stored in the second buffer 9 only the magnetic data that is read from the card 3 may overwrite the saving buffer 6. In the overwritten saving buffer 6, the data that is read during the card removal remains unedited, and the data portion that could not be read during the card removal holds the data that is read during the card insertion. Therefore, when the thus-processed data, stored in the saving buffer 6, is reported to the host device 17, the most-recently read magnetic data is sent as a result in the same manner as in the embodiment of FIG. 1. Therefore, only the data stored in the saving buffer 6 needs to be reported to the host device 17, thus simplifying the process.

Furthermore, although the data stored in the first buffer 8 during the card 3 insertion is immediately edited in the data editing portion 5 and stored in the second buffer 9 in this embodiment, the data stored in the first buffer 8 during the card insertion may be duplicated unedited in the second buffer 9 without editing by the data editing portion 5. In such a case, only when the data is edited but could not be read during the card removal, the data that is read during the card insertion is edited to complement the data that could not be read during the card removal. Therefore, the data process during the data reading can be further simplified.

Moreover, although the two buffers, the first buffer 8 and the second buffer 9, are used in this embodiment, only one buffer may be used. For example, the second buffer 9 can be omitted. While the data is read from the first buffer 8 and stored in the second buffer 9 in the above-mentioned embodiment, the data can be re-stored in the first buffer 8. In other words, the capacity of the first buffer 8 may be larger to also perform the function of the second buffer 9. With this, the number of the buffers can be reduced.

As described above, according to the manual magnetic card reader of claim 1 and the method of reading magnetic data of claim 2, the magnetic data is read during the card insertion and stored in the saving buffer; therefore, even when the magnetic data cannot be read during the card removal, the reading data that is stored in the saving buffer during the card insertion can be used to complement the data that is lost during the card removal. Consequently the magnetic card can be read twice in a single reading operation, providing double opportunities of reading the magnetic data. For this reason, the repetition of the card insertion/removal operations is reduced in half, improving the operability of the reading of the magnetic data of the magnetic card.

Also, the magnetic data is read both during the card insertion and during the card removal. Therefore, there is no need of controls to stop the reading of the data during the card removal due to a successful reading during the card insertion, or to read again only the track of a plurality of tracks that could not be read. Consequently, the process depending on the reading condition can be eliminated, thus simplifying the control.

While the foregoing description and drawings represent the present invention, it will be obvious to those skilled in the art that various changes may be made therein without departing from the true spirit and scope of the present invention.

What is claimed is:

1. A manual magnetic card reader that allows a card with a magnetic strip to be inserted in a card insert slot to a card stop position and then allows said card to be removed, comprising:

a magnetic head for reading magnetic data recorded in said magnetic strip;

a data editing portion for editing said magnetic data to exclude control codes that represent start and end of card data and a check code that is used to verify integrity of the magnetic data; and a saving buffer for saving said magnetic data of said card that is read during card insertion;

wherein said magnetic data is read and saved in said saving buffer during said card insertion and said magnetic data is also read during card removal.

2. A method of reading magnetic data of a card, used in a manual magnetic card reader that allows a card with a magnetic strip to be inserted at a card insert slot to a card stop position and then allows said card to be removed, said method comprising the steps of:

reading and saving said magnetic data during card insertion and also reading said magnetic data during card removal; when said magnetic data can be read during said card removal, using said magnetic data as reading data; and when said magnetic data cannot be read during said card removal, using said magnetic data that is read during said card insertion as reading data.

3. A manual magnetic card reader that reads a magnetic card when a card holder inserts and withdraws the magnetic card from an insertion slot while holding on to the magnetic card, comprising:

a magnetic head that reads magnetic data recorded in a magnetic strip of a magnetic card during insertion and withdrawal of the magnetic card by a card holder; and a processor operable to output insertion and withdrawal data which respectively correspond to data obtained during insertion and withdrawal, the insertion and withdrawal data being free of control codes that represent start and end of card data, the processor further operable to determine whether the withdrawal data is acceptable and to select the withdrawal data to send to a host device if the withdrawal data is determined to be acceptable regardless of the status of the insertion data.

4. The manual magnetic card reader according to claim 3, wherein the processor is further operable to:

determine whether any portion of the withdrawal data is unacceptable; and combining an acceptable portion of the withdrawal data with a portion from the insertion data which corresponds to the determined unacceptable portion of the withdrawal data.

* * * * *